United States Patent [19]

Debreczeni

[11] Patent Number: 5,678,665
[45] Date of Patent: Oct. 21, 1997

[54] HYDRAULIC BRAKE SYSTEM

[75] Inventor: Joseph Debreczeni, Brossard, Canada

[73] Assignee: Moldex Plastics & Tool Inc., Montreal, Canada

[21] Appl. No.: 592,510

[22] Filed: Jan. 26, 1996

[51] Int. Cl.$^6$ ................................................ B60T 11/00
[52] U.S. Cl. ...................... 188/344; 188/198 M; 74/502.4
[58] Field of Search ........................ 188/24.11, 24.12, 188/24.22, 344, 351, 2 D, 196 M, 106 F, 106 P; 74/502.4, 502.6; 60/584, 594

[56] References Cited

U.S. PATENT DOCUMENTS

| | | | |
|---|---|---|---|
| 3,327,913 | 6/1967 | Harrah | 60/584 |
| 3,554,334 | 1/1971 | Shimano | 188/344 |
| 3,935,930 | 2/1976 | Kine | 188/344 |
| 4,175,648 | 11/1979 | Sule | 188/344 |
| 4,665,803 | 5/1987 | Mathauser | 188/24.11 X |
| 5,368,136 | 11/1994 | Walte | 188/344 X |

*Primary Examiner*—Robert J. Oberleitner
*Assistant Examiner*—Pamela J. Lipka
*Attorney, Agent, or Firm*—George A. Seaby

[57] ABSTRACT

Hydraulic systems for bicycles or other small land vehicles include a master or control cylinder actuated by the brake lever, and a slave cylinder connected to the master cylinder by a hydraulic fluid line. The slave cylinder carries a piston, and the slave cylinder or piston is connected to the callipers for applying the brakes. With repeated use, the lever becomes loose or develops play. A solution to the problem provided by this invention incudes an adjustment screw in the slave cylinder for quickly and easily adjusting the position of the piston in the slave cylinder, so that in the rest position, the fluid pressure on the lever maintains the latter in a fixed position. An eccentric cam can also be mounted on the lever for adjusting the rest position of the lever with respect to a piston in the master cylinder to achieve the same effect. Another, advantage of the brake system described herein is the use of co-axial pistons in the master cylinder, so that a gentle force is initially applied to the callipers to move the pads gently into position against the rim, and, with the pads in position against the rim, a higher force is applied to effect a braking action.

3 Claims, 6 Drawing Sheets

HYDRAULIC BRAKE SYSTEM

BACKGROUND OF THE INVENTION

1. Field of the Invention

This invention relates to a hydraulic brake system, and in particular to a hydraulic brake system for a bicycle, a wheelchair or other small land vehicle.

2. Description of the Prior Art

In general, small land vehicles of the type listed above are equipped with hand-operated calliper brakes, which are usually actuated by cables. When the cables are pulled by applying manual pressure against operating levers, brake pads on wheel calliper units engage the rims of the vehicle wheels to effect a braking action.

In the past, hydraulic brake systems have been proposed. Examples of such systems are described in U.S. Pat. Nos. 3,899,057, issued to J. J. Carre on Aug. 12, 1995; 3,935,930, issued to M. Kine on Feb. 3, 1976; 3,993,174, issued to L. A. Williams et al on Nov. 23, 1976; 4,175,648, issued to S. Sule on Nov. 27, 1979; 4,391,353, issued to W. R. Mathausen on Jul. 5, 1983; 4,615,415, issued to W. R. Mathausen on Oct. 7, 1986; 4,632,225, issued to W. R. Mathausen on Dec. 30, 1986; 4,896,753, issued to S. Sule on Jan. 30, 1990. In general, the patented devices are somewhat complicated and hence expensive to produce. Consequently, hydraulic brake systems for use on small land vehicles have failed to gain market acceptance. The brakes in question are closed systems, including a brake pad unit with an associated single or double acting slave cylinder connected to a manually activated master cylinder by a high pressure fluid line.

The key to proper braking is the uniform application of pressure to the wheel rims. It is not uncommon for bicycle wheel rims to exhibit substantial irregularities or so-called "run-out". When a wheel rim has run-out, the rim may be contacted by the brake pads even when the hand levers are not actuated. Cyclists tend to increase the distance between the wheel rims and the brake pads in an attempt to solve this problem. While one problem is solved, another, namely poor braking performance is created. The increased distance between the rims and the brake pads uses up too much of the limited stroke of the brake levers.

Another common problem with bicycle brake systems is loose levers or handles. After repeated uses, the brake levers become loose or floppy. Currently available brake systems provide no easy method of correcting this problem.

GENERAL DESCRIPTION OF THE INVENTION

An object of the present invention is to provide solutions to the above problems in the form of a relatively simple, easily mass produced brake system for use on bicycles and other small land vehicles.

A second object of the invention is to provide a hydraulic brake system which is easy to adjust, i.e. which includes elements for quickly and easily adjusting the brakes to reduce play in loose brake levers.

A third object of the invention is to provide a brake system which permits a substantial gap between brake pads and wheel rims without reducing brake efficiency.

Yet another object of the invention is to provide a brake system which permits a user to generate a relatively high "true" braking force, i.e. a braking force which is actually applied to the rim, and not wasted in reaching the rim.

According to one aspect, the present invention relates to a hydraulic brake system for a small land vehicle comprising manually actuated operating means including master cylinder means; master piston means slidably mounted in said master cylinder means; lever means on said master cylinder means for moving said master piston means from a rest to a braking position in said master cylinder means; slave cylinder means for attachment to a calliper brake assembly for activating the brake assembly; hollow slave piston means for mounting on a small vehicle frame, said slave cylinder means and said slave piston means defining a slave chamber, and said slave piston means slidably supporting said slave cylinder means, whereby, when said operating means is actuated, pressure fluid flows from said master cylinder to said slave chamber for activating the brakes; and pin means extending into said slave piston means for adjusting the volume of said slave chamber, and consequently the volume of the system as a whole to change the fluid pressure acting on the lever means in the rest position.

In accordance with a second aspect the invention relates to a hydraulic brake system for a small land vehicle comprising manually actuated operating means including master cylinder means; first and second master piston means independently slidable in said master cylinder means; lever means on said master cylinder means for initially moving said first master piston means and then both said first and second master piston means from a rest position to a braking position in said master cylinder means; slave cylinder means for attachment to a calliper brake assembly for activating the brake assembly; hollow slave piston means for mounting on a small vehicle frame, said slave cylinder means and said slave piston means defining a slave chamber, and said slave piston means slidably supporting said slave cylinder means, whereby when said operating means is actuated, pressure fluid flows from said master cylinder to said slave chamber for first moving said brake assembly from a rest position to a braking position and then effecting a braking action; and pin means extending into said slave piston means adjusting the volume of said slave chamber, and consequently the volume of the system as a whole to change the fluid pressure acting on the lever means in the rest position.

BRIEF DESCRIPTION OF THE DRAWINGS

The invention is described hereinafter in greater detail with reference to the accompanying drawings, which illustrate preferred embodiments of the invention, and wherein.

DESCRIPTION OF THE PREFERRED EMBODIMENT

While the following description is limited to a bicycle brake system, as mentioned above and as the man skilled in the art will appreciate, the system can be used on other small land vehicles.

Figure 1:
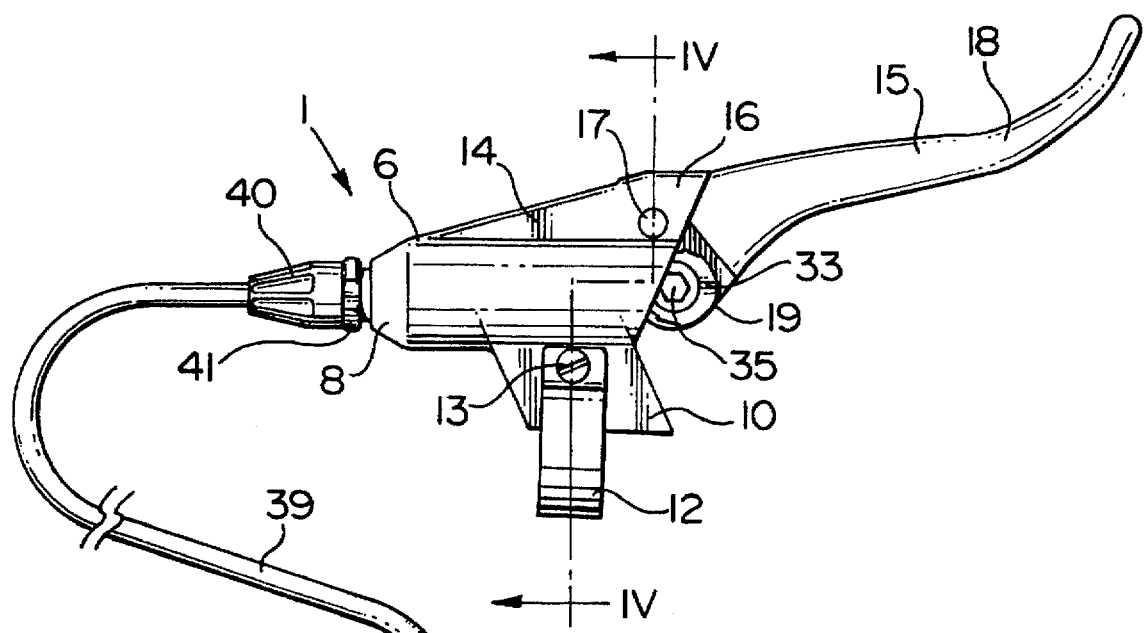
FIG. 1 is a schematic side view of a first embodiment of a brake system in accordance with the present invention.
Figure 1:
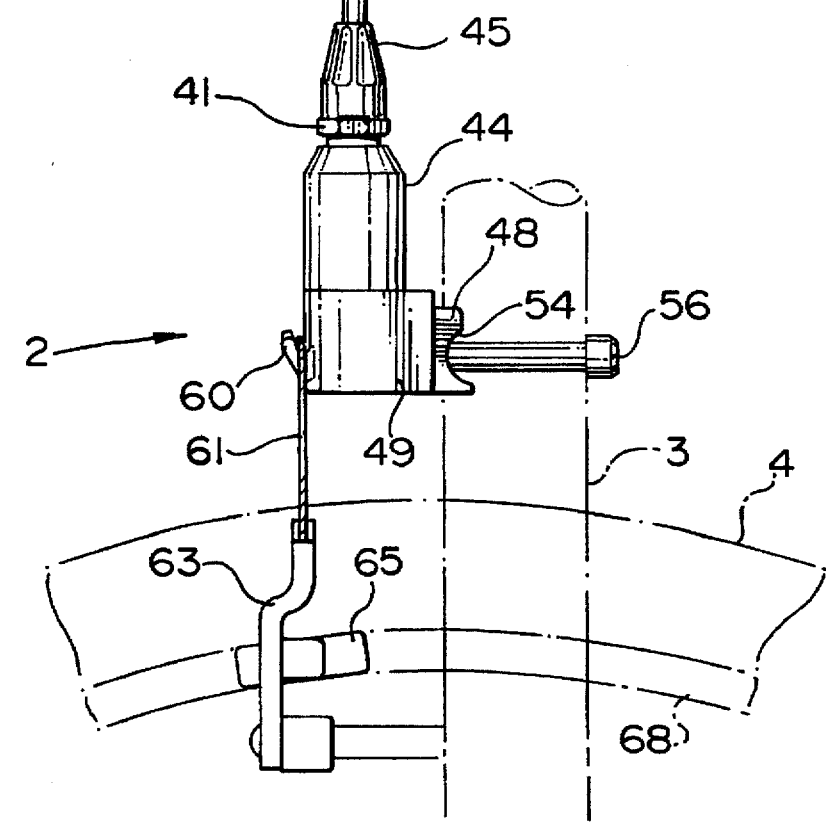
Figure 2:
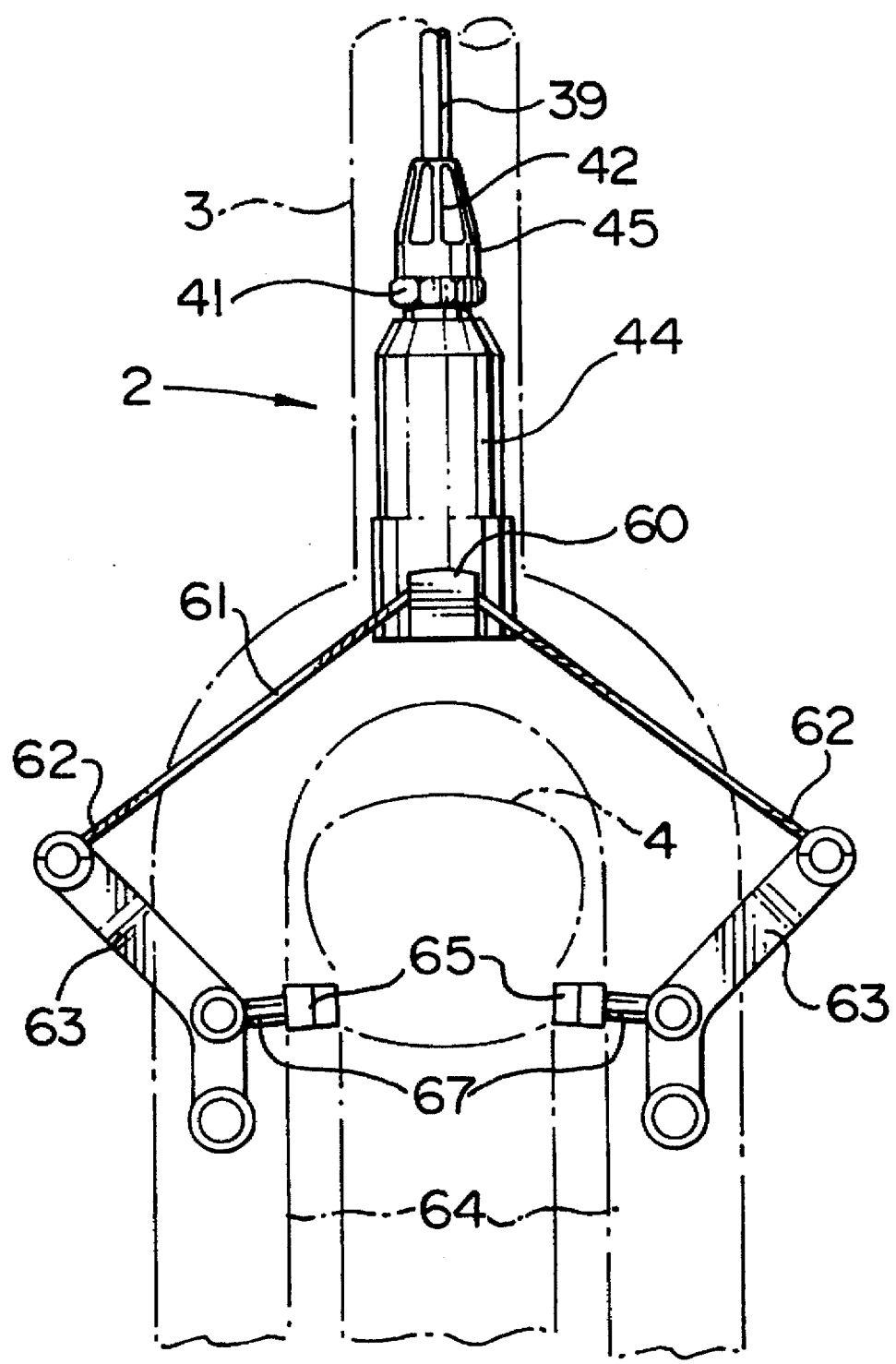
FIG. 2 is a schematic front view of the bottom end of the assembly of FIG. 1.

Referring to FIGS. 1 and 2, the basic elements of the invention include an operating assembly generally indicated at 1 for mounting on the handlebars (not shown) of a bicycle, and a slave cylinder generally indicated at 2 for mounting on the frame 3 of the bicycle proximate a wheel 4.

Figure 4:
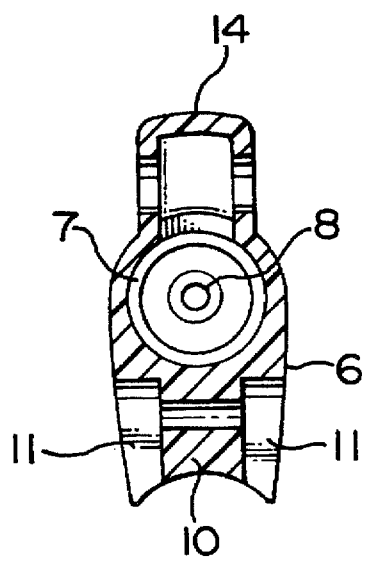
FIG. 4 is a cross section of the casing of the system taken generally along line IV—IV of FIG. 1.
Figure 5:
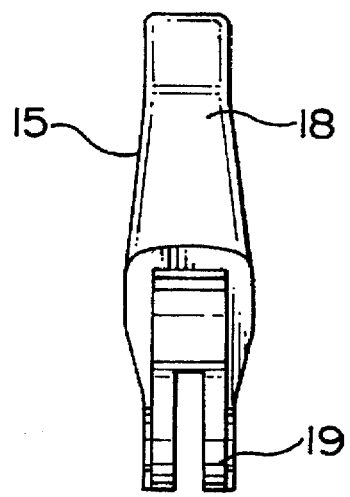
FIG. 5 is an end view of a lever used in the system of FIGS. 1 and 2.

The operating assembly 1 includes an elongated generally cylindrical master cylinder in the form of a casing 6 with open ends 7 and 8. An arm 10 extends downwardly from one end 7 of the casing 6. Recesses 11 (FIG. 4) in the sides of the arm 10 receive the ends of a bracket 12, which is connected to the arm 10 by a screw 13 (FIG. 1) for mounting the assembly 1 on the handlebar (not shown) of the bicycle. A second, hollow, generally triangular arm 14 extends upwardly from the top of the casing 6. A manually operated lever 15 is pivotally connected to the open rear end 16 of the arm 14 by a pin 17. As best shown in FIG. 5, the lever 15 includes an arcuate outer handle portion 18, and a bifurcated front end 19, which receives the pin 17.

Figure 3:
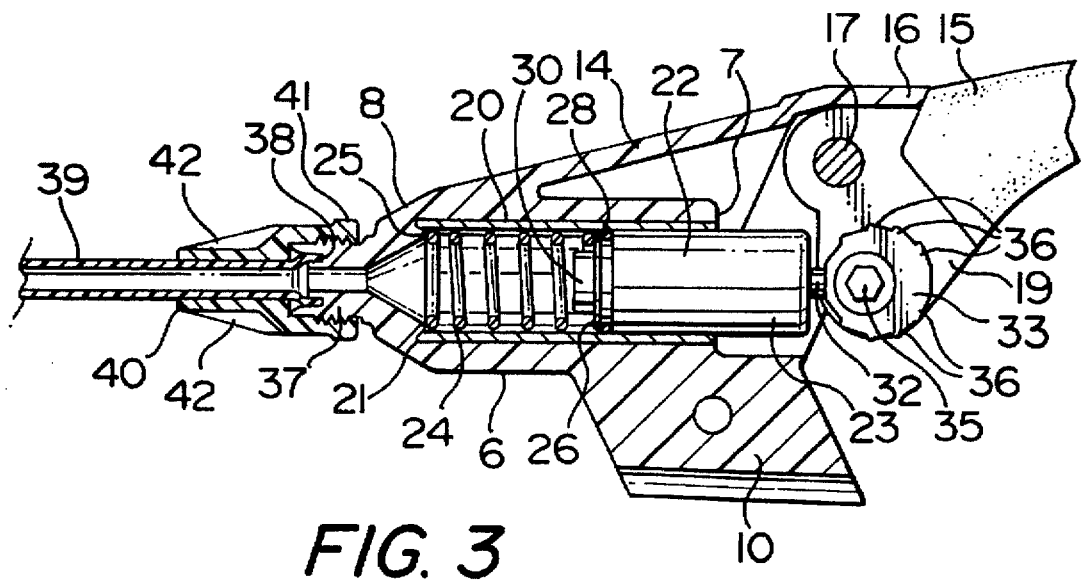
FIG. 3 is a longitudinal-sectional view of a brake operating assembly used in the system of FIGS. 1 and 2.

With reference to FIG. 3, the casing 6 defines a pressure chamber, the cylindrical side of which is lined with a cylindrical bushing 20 extending between the open end 7 and an annular recess 21 near the front of the casing. The bushing 20 slidably supports a main piston 22, one end 23 of which extends out of the open end 7 of the casing 6. The piston 22 is biased outwardly by a helical spring 24, one end of which bears against a shoulder 25 in the pressure chamber, and the other end of which bears against a shoulder 26 on the inner end of the piston 22. An annular seal 28 is provided on the inner end of the shoulder 26 of the piston 22. The smaller diameter, stepped inner end 30 of the piston extends from the shoulder 26 into the spring 24.

A small button 32 extends outwardly from the other end 23 of the piston 22 into engagement with an actuating wheel 33 mounted between the arms of the bifurcated end 29 of the lever 15 in the open end of the casing 6. The cam wheel 33 is carried by a bolt 35, and includes a plurality of steps 36 on its periphery. The wheel 33 is eccentrically mounted on the bolt 34 for changing the rest position of the piston 22 in the cylinder, i.e. in the bushing 20. As usually happens with brake systems employing cables or hydraulics, after many repeated applying of the brakes, the handle or lever 15 becomes slightly sloppy. One way to remove the sloppiness, i.e. to tighten the brakes is to rotate the cam wheel 33. Because the wheel 33 is eccentrically mounted on the bolt 35, rotation of the wheel changes the position of the piston 22 in the casing 6, and consequently the back pressure on the lever 15. Rotation (downward movement) of the lever 15 towards the brake actuating position results in a corresponding rotation of the wheel 33 against the bottom 32 and forward movement of the piston 22 in the bushing 20. When the lever 15 is released, the spring 24 returns the piston 22 to the rest position (FIG. 3).

The front end of the passage in the casing 6 is generally frusto-conical and then cylindrical in an externally threaded neck 37. An annular recess 38 in the outer end of the neck 37 receives one end of a high pressure fluid line 39, which extends between the operating assembly 1 and the slave cylinder assembly 2. The line 39 is held in position by an internally threaded sleeve-like cap or nut 40. The nut 40 includes a hexagonal end 41 for rotation using a spanner (not shown), and a fluted outer end with longitudinally extending strengthening ribs 42.

Figure 6:
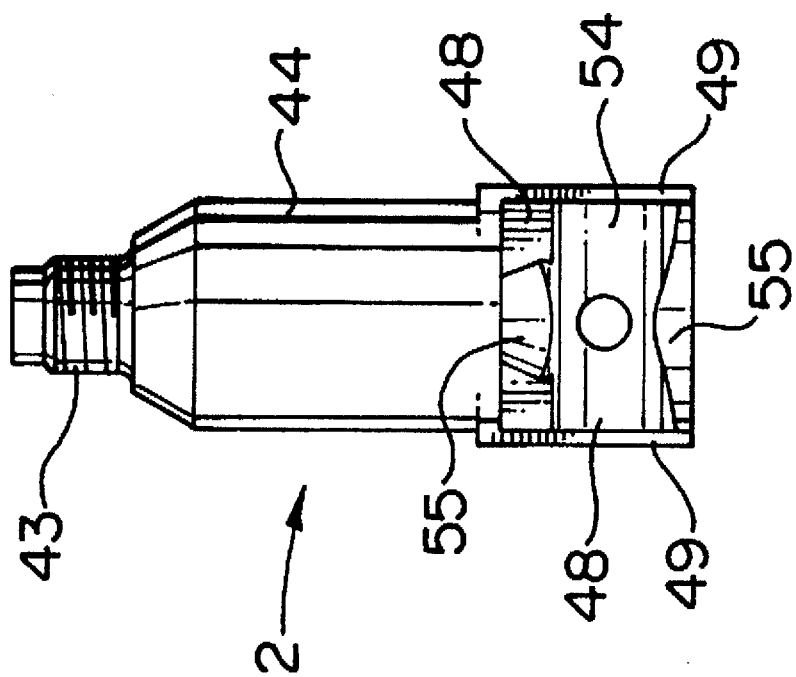
FIG. 6 is a front view of a slave cylinder assembly used in the system of FIGS. 1 and 2.
Figure 7:
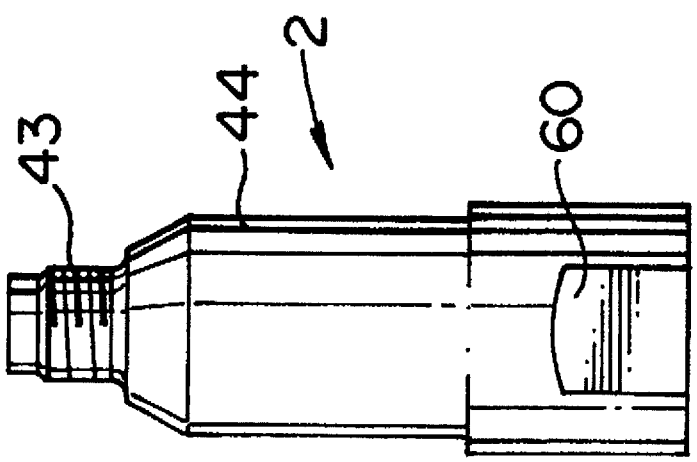
FIG. 7 is a rear view of the slave cylinder assembly of FIG. 6.

The above described arrangement exists in the slave cylinder assembly 2 at the other end of the line 39, where the line 39 is held on an externally threaded neck 43 on the top end of the cylindrical casing 44 of the assembly 2 by an internally threaded cap or nut 45. The casing 44 is slidably mounted on a cylindrical piston 47. An arm 48 extends outwardly from the bottom of the piston 47 for connecting the assembly 2 to the frame 3 of the bicycle. The cylinder 44 is retained on the piston 47 by a pair of parallel arms 49 (FIGS. 6 and 8) extending outwardly from the bottom end of the cylinder 44. Hooks 50 on the outer bottom free ends of the arms 49 slide in rectangular recesses 51 in the sides of the arm 48. Upward movement of the cylinder 44 is limited by shoulders 52 at the top ends of the recesses 51. Concave 54 and 55 are provided in the outer free end of the arm 48 for tight coupling of the arm to the frame 3 of the bicycle. The arm 48 is connected to the frame 3 by a bolt 56 (FIG. 9) extending through the frame into a nut 57 in a recess in the bottom of the arm 48. A hook 60 is provided on the other side of the bottom end of the casing 44 for receiving the center of a cable 61. As shown in FIG. 2, the ends 62 of the cable 61 are connected to the outer free ends of brake callipers 63. The callipers 63 are pivotally connected to the forks 64 of the bicycle, and carry brake pads 65 on arms 67 for bearing against the rim 68 (FIG. 1) of the wheel 4. During operation of the brakes, the brake system of the present invention causes actuation of the brakes, while the usual springs (not shown) on the callipers 63 return the pads 65 to the rest position.

Figure 8:
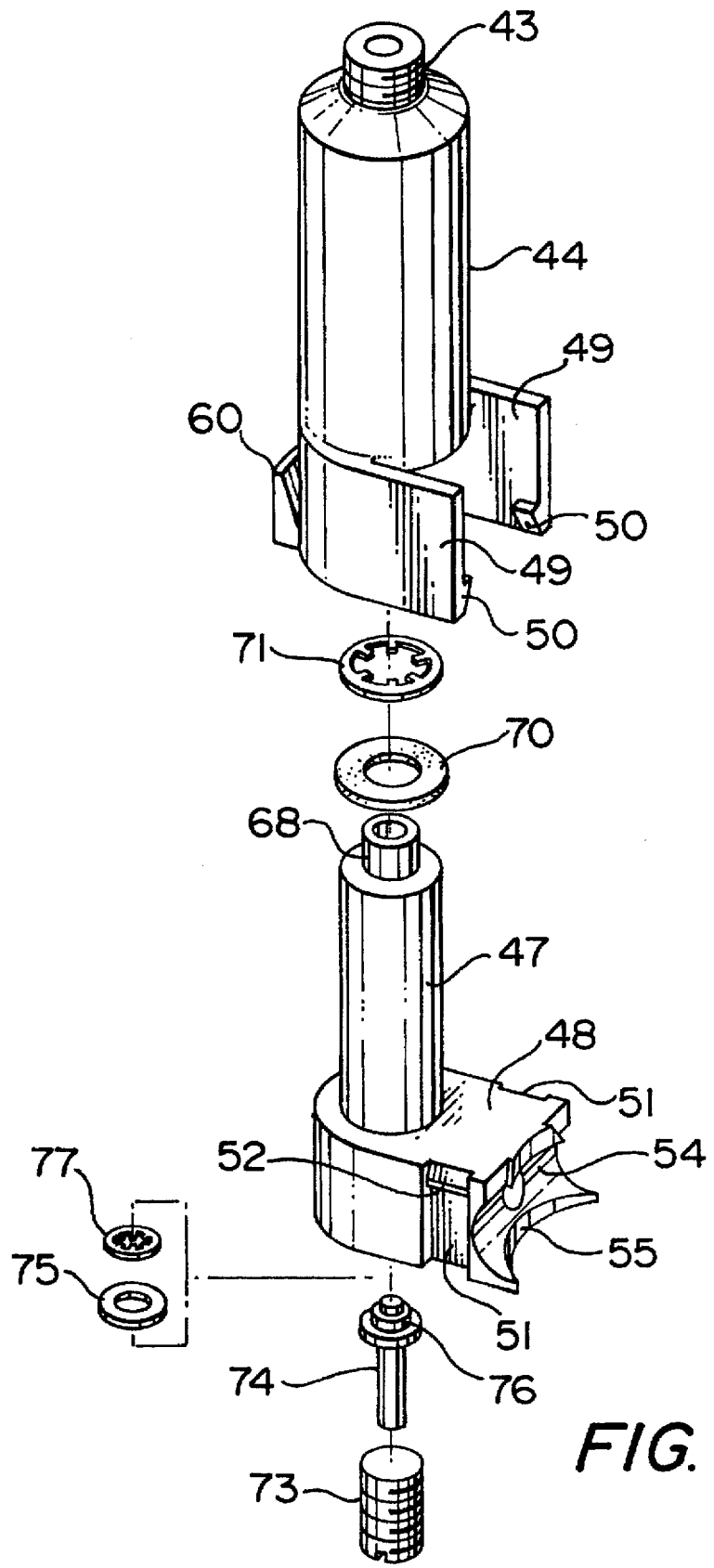
FIG. 8 is an exploded, isometric view of the slave cylinder assembly of FIGS. 6 and 7.
Figure 9:
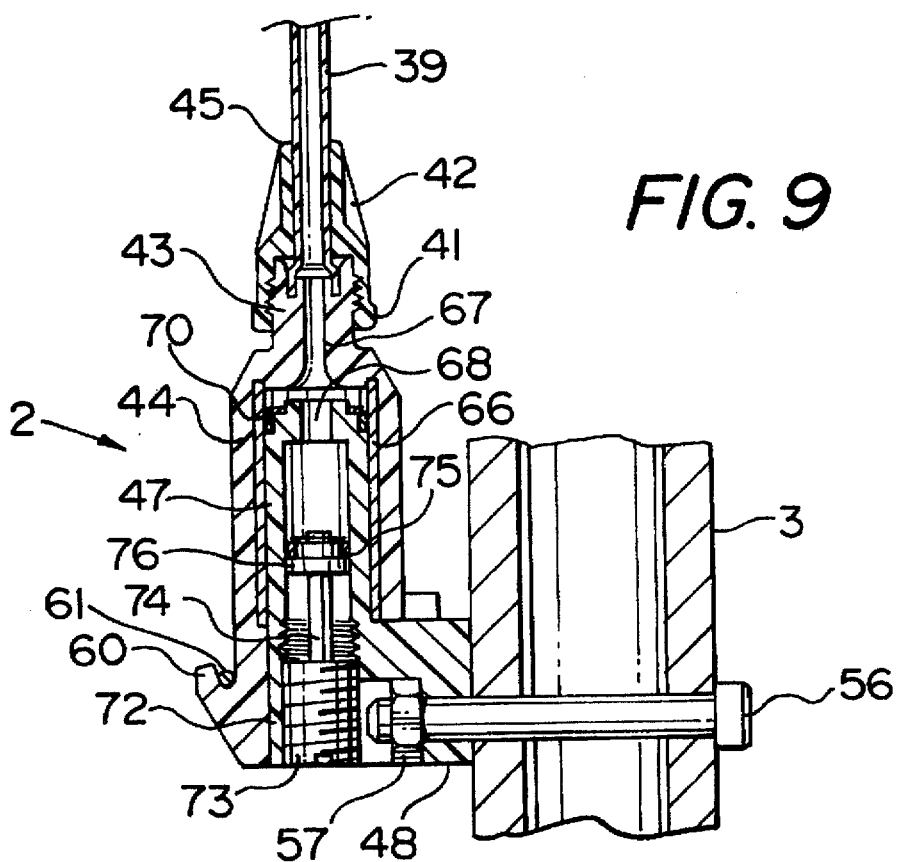
FIG. 9 is a longitudinal-sectional view of the slave cylinder assembly of FIGS. 6 to 8.

The casing 44 defines a slave cylinder, which contains a bushing 66 facilitating sliding of the casing on the piston 47. Fluid flows into and out of the casing 44 via a passage 67 in the track 43 and in the top end of the casing. The piston 47 is defined by a tubular body with an open top end 68. The stepped top end 68 of the piston 47 is sealed in the bushing 66 by an annular seal 70 and a self seating retaining ring 71 (FIG. 8). The internally threaded bottom end 72 of the piston 47 is sealed by an externally threaded plug 73. A pin 74 is retained in the piston 47 by the plug 73. An annular seal 75 is provided on the stepped head 76 of the pin 74. The seal 75 is retained on the pin 74 by a self seating retaining ring 77.

In operation, with the piston 22 and the casing 44 in the rest positions (FIG. 3), when pressure is applied to the lever 15, fluid flows from the casing 6 through the line 30 to the casing 44. The fluid enters the casing 44 and, because the piston 47 is fixed, the casing 44 moves upwardly. Upward movement of the casing 44 is accompanied by corresponding movement of the cable 61 and pivoting of the callipers 63 to move the brake pads 65 against the rim 68 of the wheel 4.

As mentioned above, after repeated uses, the lever 15 often becomes loose or sloppy. By rotating the cam 33, the rest position of the piston 22 is changed to tighten the lever 15. Alternatively, the plug 73 is rotated to move the pin 74 upwardly, reducing the volume of the chamber or cylinder in the position 47. The result is the same as that achieved by rotating the cam 33, namely increased back pressure on the lever 15 to reduce play.

In the following description of a second embodiment of the control cylinder, wherever possible the same reference numerals have been used to identify elements the same as or similar to elements illustrated in FIGS. 1 and 3.

The second embodiment of the control cylinder (FIG. 10) is similar to the first embodiment, except that the piston in the control cylinder is replaced by co-axial pistons.

Figure 10:
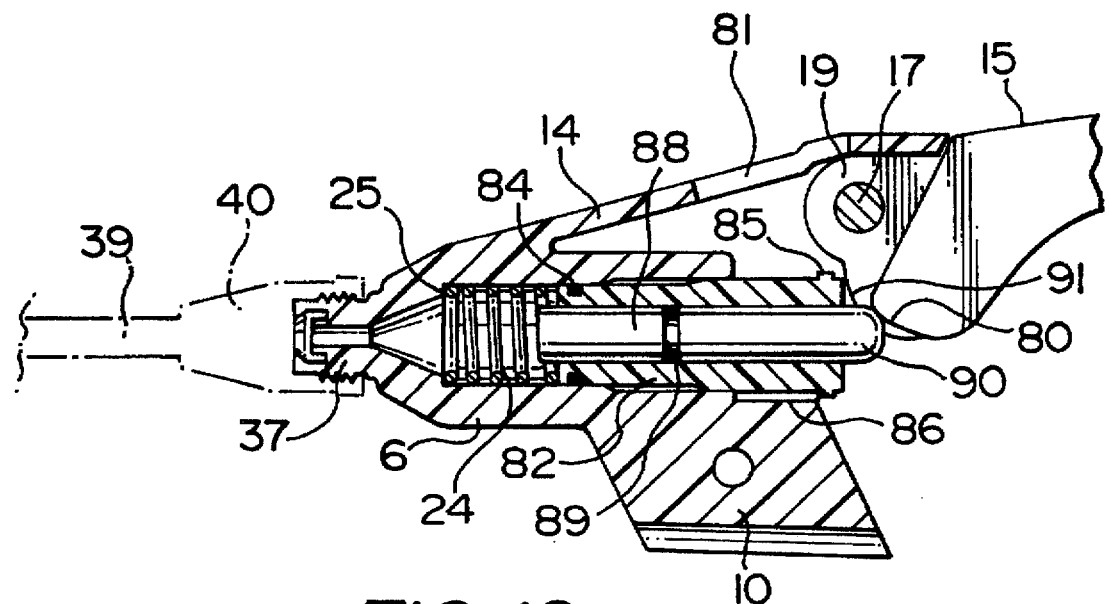
FIG. 10 is a longitudinal sectional view of a second embodiment of the operating assembly used in the system of FIGS. 1 and 2.

Referring to FIG. 10, in the second embodiment of the invention, the bottom or front end 19 of the operating lever 15 includes a shoulder 80. Because during pivoting of the lever around the longitudinal axis of the pin 17, the bottom end abuts the top of the casing arm 14, an opening 81 is provided in such top to permit full rotation of the lever 15.

The casing 6 defines a cylinder for slidably receiving a cylindrical piston 82. An O-ring 84 seals the inner end of the piston 82 in the casing 6. Inward movement of the piston 82 is limited by an annular shoulder 85 on the outer end of the piston which slides on a shoulder 86 in the cylinder portion of the casing. A second piston 88 is slidably mounted in the piston 82. As the O-ring 89 seals the piston 88 in the piston 82. The outer end 90 of the piston 88 is engaged by the shoulder 80 on the lever 15.

During operation of the second embodiment of the control cylinder, initial pivoting of the lever 15 to operate the brakes causes movement of the smaller internal piston 88 towards the line 39. Thus, a small pressure is created in the piston 47 to move the brake pads 65 against the rim 68 of the wheel 4. With the pads 65 in position a higher, braking force is required. The braking force is generated when a second shoulder 91 presses against the outer end of the piston 82 to move the latter inwardly. Thus, the fluid pressure in the piston 47 is increased to apply braking force to the wheel rim 68. At the end of a braking operation, the spring 24 returns the piston 82 to the rest position. Fluid back pressure returns the smaller piston 88 to the rest position.

It will be appreciated that in the second embodiment of the invention the only adjustment to the back pressure on the lever 15 (to reduce play) is found in the slave cylinder 44.

The use of the system described hereinbefore allows for easy adjustment of fluid pressure for eliminating play in brake levers. Moreover, when a pair of pistons are used in the master or control cylinder, the brakes are applied in two stages. A small amount of pressure on the brake levers moves the brake pads against the wheel rims, and higher pressure is applied only to effect actual braking.

We claim:

1. A hydraulic brake system for a small land vehicle comprising manually actuated operating means including master cylinder means; master piston means slidably mounted in said master cylinder means; lever means on said master cylinder means for moving said master piston means from a rest to a braking position in said master cylinder means; cam means on said lever means for changing the point of contact of said lever means with said master piston means in a rest position of the lever means, whereby play in the lever means is reduced at the operating means; slave cylinder means for attachment to a calliper brake assembly for activating the brake assembly; hollow slave piston means for mounting on a small vehicle frame, said slave cylinder means and said slave piston means defining a slave chamber, and said slave piston means slidably supporting said slave cylinder means, whereby, when said operating means is actuated, pressure fluid flows from said master cylinder to said slave chamber for activating the brakes; and pin means extending into said slave piston means for adjusting the volume of said slave chamber, and consequently the volume of the system as a whole to change the fluid pressure acting on the lever means in the rest position.

2. A brake system according to claim 1, wherein said cam means includes wheel means on said lever means; and a plurality of step means of different dimensions on said wheel means for engaging an outer end of said master piston means, whereby the rest position of said lever means with respect to said master piston means can readily be adjusted.

3. A brake system according to claim 1, including threaded plug means adjustably retaining said pin means in said slave piston means, whereby the position of said pin means in said slave chamber can readily be changed in said slave chamber.

* * * * *